United States Patent
Schwark et al.

(10) Patent No.: US 10,871,218 B2
(45) Date of Patent: Dec. 22, 2020

(54) INJECTION MOLDED RETENTION METHOD FOR POWER TRANSFER DEVICES

(71) Applicant: Magna Powertrain of America, Inc., Troy, MI (US)

(72) Inventors: Paul W. Schwark, Royal Oak, MI (US); Bradley S. Ketchel, Oxford, MI (US)

(73) Assignee: MAGNA POWERTRAIN OF AMERICA, INC., Troy, MI (US)

(*) Notice: Subject to any disclaimer, the term of this patent is extended or adjusted under 35 U.S.C. 154(b) by 968 days.

(21) Appl. No.: 15/213,452

(22) Filed: Jul. 19, 2016

(65) Prior Publication Data
US 2017/0030455 A1 Feb. 2, 2017

Related U.S. Application Data

(60) Provisional application No. 62/197,996, filed on Jul. 28, 2015.

(51) Int. Cl.
| | | |
|---|---|---|
| *F16H 57/03* | (2012.01) | |
| *F16H 48/38* | (2012.01) | |
| *F16H 48/08* | (2006.01) | |
| *F16H 57/037* | (2012.01) | |

(52) U.S. Cl.
CPC ........... *F16H 57/037* (2013.01); *F16H 48/08* (2013.01); *F16H 48/38* (2013.01)

(58) Field of Classification Search
None
See application file for complete search history.

(56) References Cited

U.S. PATENT DOCUMENTS

| | | | |
|---|---|---|---|
| 3,764,647 A | 10/1973 | McDow | |
| 3,905,089 A | 9/1975 | Osenbaugh et al. | |
| 4,788,877 A | 12/1988 | Robinson et al. | |
| 6,623,867 B2 * | 9/2003 | Crocco | B22D 19/14 |
| | | | 428/539.5 |
| 7,887,422 B2 | 2/2011 | Stambek et al. | |
| 8,316,738 B2 | 11/2012 | Hellinger et al. | |
| 9,022,892 B1 | 5/2015 | Marsh, Jr. et al. | |

(Continued)

FOREIGN PATENT DOCUMENTS

| | | |
|---|---|---|
| CA | 2347842 A1 | 4/2000 |
| DE | 2500666 A1 | 8/1975 |

(Continued)

OTHER PUBLICATIONS

Office Action dated Jun. 8, 2017 from corresponding German Patent Application No. 102016213402.7.

(Continued)

*Primary Examiner* — Colby M Hansen
(74) *Attorney, Agent, or Firm* — Dickinson Wright PLLC (57) ABSTRACT

A drive axle unit for use in a motor vehicle having a multi-piece axle housing assembly including at least two housing components interconnected via at least one in-situ molded retainer component. A method for securing at least two housing components of an axle housing assembly by injecting a molten material into a pair of aligned mold indentations formed in the two housing components which solidifies to create an in-situ molded retainer component.

22 Claims, 6 Drawing Sheets

(56) References Cited

U.S. PATENT DOCUMENTS

| | | | | |
|---|---|---|---|---|
| 2007/0093348 A1* | 4/2007 | Demirdogen | ............ | F16H 48/08 475/230 |
| 2009/0280946 A1* | 11/2009 | Matsuda | ................. | F16H 48/08 475/230 |
| 2016/0355054 A1* | 12/2016 | Jensen | ..................... | B60B 35/16 |

FOREIGN PATENT DOCUMENTS

| | | |
|---|---|---|
| DE | 202015002723 U1 | 6/2015 |
| DE | 102015105956 A1 | 10/2015 |
| WO | WO2015073485 A1 | 5/2015 |

OTHER PUBLICATIONS

Search Report dated Jun. 21, 2019 from corresponding Chinese patent application No. 201610603049.5.

\* cited by examiner

INJECTION MOLDED RETENTION METHOD FOR POWER TRANSFER DEVICES

CROSS REFERENCE TO RELATED APPLICATIONS

This application claims the benefit of U.S. Provisional Patent Application Ser. No. 62/197,996 filed on Jul. 28, 2015, and titled "INJECTION MOLDED RETENTION METHOD FOR POWER TRANSFER DEVICES", the entire disclosure of which is hereby incorporated by reference.

FIELD

The present disclosure relates generally to power transfer devices of the type used in motor vehicle drivelines. More particularly, the present disclosure relates to an axle drive unit having a multi-piece housing assembly with at least two housing components interconnected using injection molded retainers and an injection molding process operable to make in-situ molded retainers that are positioned for interconnecting the at least two components of the multi-piece housing assembly.

BACKGROUND

This section provides background information related to the present disclosure which does not necessarily prior art to the inventive concepts disclosed and claimed herein.

Power transfer devices are installed in the drivetrain of motor vehicles to transfer rotary power (i.e., drive torque) from an input through one or more gearsets to at least one output. An axle drive unit of the type commonly associated with an axle assembly is one type of power transfer device. A conventional drive axle unit typically includes an axle housing defining an input housing segment and a differential housing segment, an input assembly retained within the input housing segment, and a differential assembly retained within the differential housing segment. The input assembly includes a pinion shaft rotatably supported by a pair of laterally-spaced bearing assemblies mounted in a pinion cartridge housing which, in turn, is fixed in the input housing segment of the axle housing. The differential assembly typically includes a differential carrier and a differential gearset configured to transmit drive torque from the differential carrier to a pair of axleshafts which, in turn, drive a pair of wheels positioned on opposite sides of the motor vehicle. The differential carrier is rotatably supported within the differential housing segment of the axle housing via a first differential bearing assembly mounted on a first bearing support associated with the axle housing and a second differential bearing assembly mounted on a second bearing support associated with an axle housing cover which, in turn, is secured to the axle housing. A hypoid gearset transmits drive torque from the pinion shaft to the differential carrier and includes a pinion gear driven by the pinion shaft and which is meshed with a ring gear that is fixed for rotation with the differential carrier.

In most conventional axle drive units, the axle housing cover and the pinion cartridge housing are secured to the axle housing via a welding process or, in the alternative, using a plurality of threaded fasteners. For example, the axle housing cover and the pinion cartridge housing each include a ring-shaped mounting flange having a plurality of mounting apertures that are alignable with threaded mounting bores formed in mating flange portions of the axle housing for receipt of the threaded fasteners. Known disadvantages associated with such "bolted" multi-piece axle housing assemblies include the cost associated with machining the threaded bores, the flange sealing requirements, and the precise torque requirements of the threaded fastener. Additionally, the differential bearings typically require a preloading operation. For bolted axle housing assemblies, the preload is provided by shims disposed within the assembly and sometimes a deformable component, such as a crush sleeve, is used to prevent bearing overload.

In view of the above, there remains a continuing need to develop further improvements to power transfer devices, and drive axle units in particular, which overcome the shortcomings of conventional multi-piece housing assemblies and provide improvements in weight savings, reduced assembly complexity, and retention/sealing methods.

SUMMARY

This section provides a general summary of the disclosure and is not a comprehensive disclosure of its full scope or all of its aspects and features. The description and specific examples disclosed in this summary are not intended to limit the scope of the inventive concepts disclosed herein.

It is an aspect of the present disclosure to provide a drive axle unit of the type adapted for use in motor vehicle drivelines and which is equipped with a multi-piece axle housing assembly having at least two housing components interconnected via at least one injection-molded retainer component.

It is a related aspect of the present disclosure to provide a method for securing at least two housing components of a multi-piece axle housing assembly by injecting a molten material into a pair of aligned mold indentation formed in the two housing components which solidifies to create an in-situ injection-molded retainer component.

In accordance with these and other aspects of the present disclosure, a power transfer device, in a non-limiting configuration as a drive axle unit, is provided which includes a pinion shaft assembly, a differential assembly, a hypoid gearset, an axle housing assembly including a first housing component and a second housing component, and an injection-molded retention arrangement adapted to be formed between the first and second housing components. The first housing component is an axle housing configured to define a pinion housing segment adapted to rotatably support the pinion shaft assembly, and a differential housing segment adapted to rotatably support a first portion of the differential assembly. The second housing component is an axle housing cover adapted to be secured to an open end of the axle housing and rotatably support a second portion of the differential assembly. The axle housing cover has an outer peripheral edge surface configured to be in close proximity to, or press-fit engagement with, an inner peripheral edge surface of the open end of the axle housing. A first annular mold indentation is formed in the inner peripheral edge surface of the axle housing and is alignable with a second annular mold indentation formed in the outer peripheral edge surface of the axle housing cover to define a first retainer mold channel or chamber. One or more first injection molding gates communicate with at least one of the first and second mold indentations to provide a flow path for injection of a molten material into the first retainer mold chamber formed between the aligned first and second mold indentations. The molten material is injected to fill the first retainer mold chamber and is allowed to cool and solidify into an in-situ molded first retainer component.

In accordance with another aspect, the pinion shaft assembly includes a pinion cartridge housing disposed within the pinion housing segment of the axle housing. The pinion cartridge housing has an outer wall surface configured to be in close proximity to, or pressed engagement with, an inner wall surface of the pinion housing segment of the axle housing. A third annular mold indentation is formed in the inner wall surface of the axle housing and is alignable with a fourth annular mold indentation formed in the outer wall surface of the pinion cartridge housing to define a second retainer mold channel or chamber. One or more second injection molding gates communicate with at least one of the third and fourth mold indentations to provide a flow path for injection of a molten material into the second retainer mold chamber formed between the aligned third and fourth mold indentations. The molten material is injected to fill the second retainer mold chamber and is allowed to cool and solidify into an in-situ molded second retainer component.

It is a further aspect to provide a pair of laterally-spaced first retainer components between the axle housing and the axle housing cover, each of the pair of first retainer components being formed in a corresponding first retainer mold chamber configured to receive the molten material via a first molding gate. Additionally or optionally, it is a related aspect to provide a pair of laterally-spaced second retainer components between the axle housing and the pinion cartridge, each of the pair of second retainer components being formed in a corresponding second retainer mold chamber configured to receive the molten material via second molding gate.

It is another aspect to configure the alignable mold indentations as arcuate grooves to define circular ring-shaped retainer components. Alternatively, one or more of the alignable mold indentations is configured to be a non-arcuate groove to define irregular-shaped retainer components.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and are not intended to limit the scope of the present disclosure. Accordingly, the inventive concepts associated with the present disclosure will be more readily understood by reference to the following description in combination with the accompanying drawings, wherein.

DETAILED DESCRIPTION

One or more example embodiments of a power transfer device will now be described more fully with reference to the accompanying drawings. The power transfer device, particularly directed to a drive axle unit, is adapted for use in motor vehicle drivetrain/driveline applications for transmitting drive torque from an input to at least one output through a gearset. However, the example embodiments are only provided so that this disclosure will be thorough and fully convey the intended scope to those who are skilled in the art. Numerous specific details are set forth such as, for example, components, devices, assemblies and methods to provide a thorough understanding of embodiments of the present disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "compromises," "comprising," "including," and "having," are inclusive and therefore specify the presence of stated features, integers, steps, operations, elements, and/or components, but do not preclude the presence or addition of one or more other features, integers, steps, operations, elements, and/or components, but do not preclude the presence or addition of one or more other features, integers, steps operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In general, the present disclosure is directed to one or more embodiments of a housing assembly of the type well suited for drive axle units or modules associated with motor vehicle axle assemblies or transaxles. The housing assembly is configured to rotatably support a pinion shaft assembly and a differential assembly. A hypoid gearset is provided to transmit rotary power, hereinafter referred to as drive torque, from the pinion shaft assembly to the differential assembly. The housing assembly is configured to include an axle housing, a pinion cartridge housing, and an axle housing cover. An in-situ molded retainer component is formed using an injection molding process so as to be located in a retainer mold channel or chamber formed between the axle housing and at least one of the axle housing cover and the pinion cartridge housing. The specific molded retention arrangements disclosed herein each include a retainer mold chamber comprised of a first retention indentation or groove formed in the axle housing and a second retention indentation or groove formed in one of the axle housing cover and the pinion cartridge housing that is alignable with the first retention groove. Following alignment, a molten material is injected into the retainer mold chamber formed by the aligned first and second retention grooves and which is allowed to solidify to provide an in-situ molded retainer component.

Figure 1:
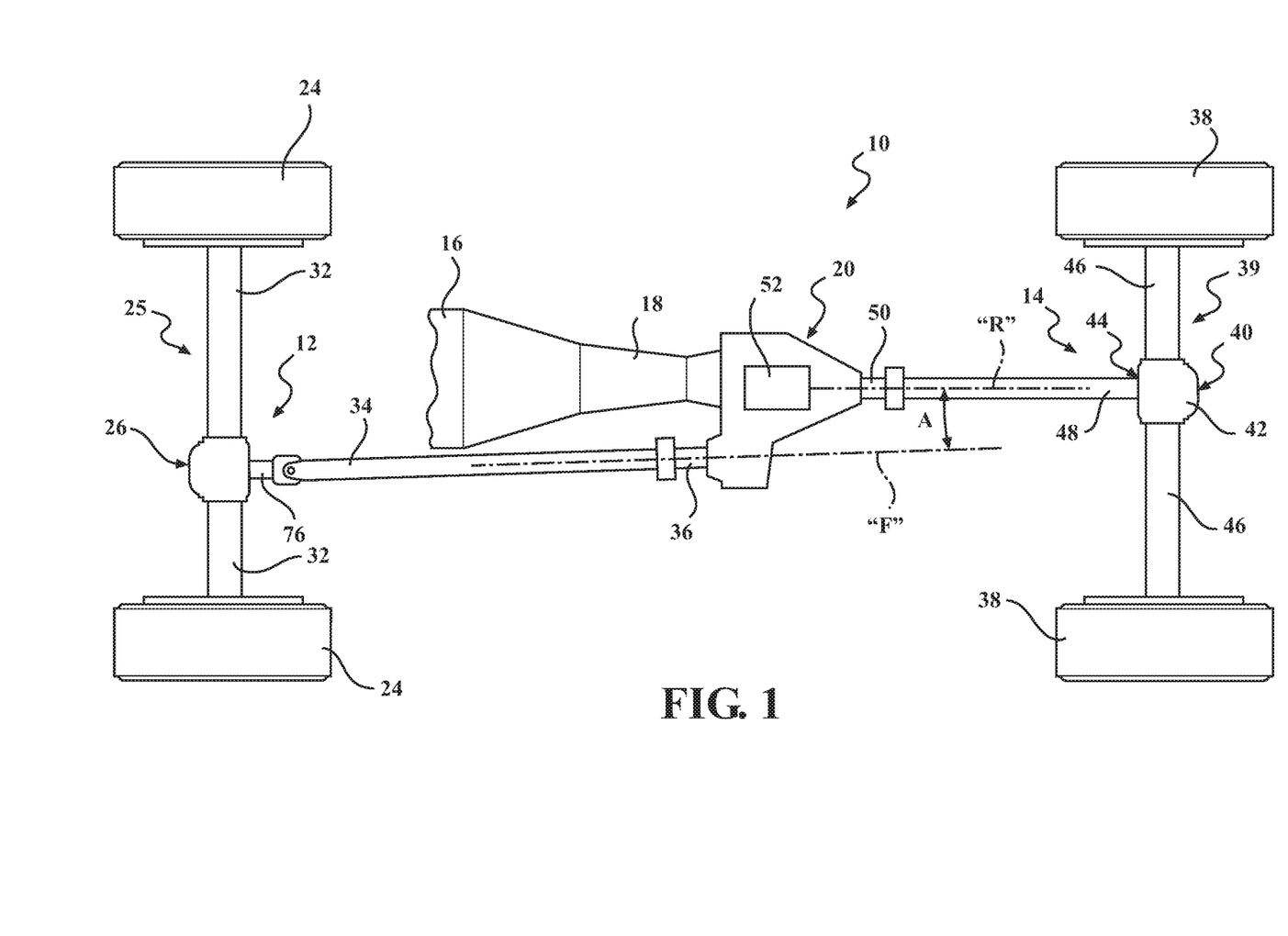
FIG. 1 is a schematic view of a four-wheel drive motor equipped with at least one power transfer unit having a housing assembly constructed and assembled in accordance with the teachings of the present disclosure.

With particular reference to FIG. 1 of the drawings, a drivetrain 10 for a four-wheel drive vehicle is shown. Drivetrain 10 includes a front driveline 12 and a rear driveline 14 both driveable by a powertrain which includes, in this non-limiting example, an internal combustion engine 16 and a transmission 18. Drivetrain 10 is further shown to include a power transfer device, hereinafter referred to as transfer case 20, for transmitting drive torque from the powertrain to front driveline 12 and rear driveline 14. One non-limiting example of a construction of functional operation of transfer case 20 is shown and described in commonly-owned U.S. Pat. No. 8,316,738, the entire disclosure of which is incorporated herein by reference. Regardless of the type of transfer case utilized in drivetrain 10, transfer case 20 is configured to include a mode clutch operable for selectively and/or automatically transmitting drive torque generated by the powertrain to front driveline 12 in addition to rear driveline 14 to establish a four-wheel drive operating mode.

Figure 2:
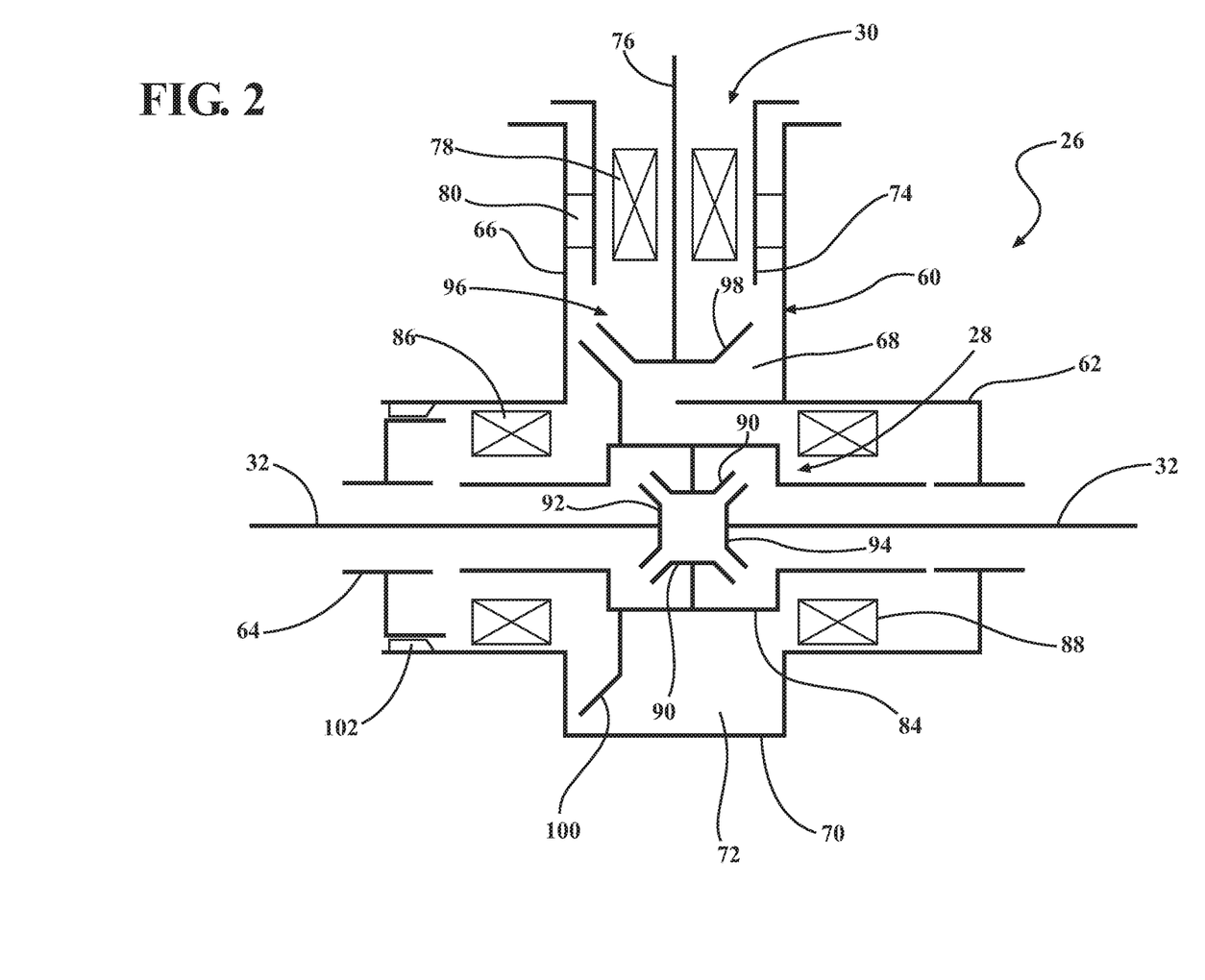
FIG. 2 is a stick diagram illustrating of a drive axle unit associated with at least one of the front and rear axle assemblies shown in FIG. 1.
Figure 3:
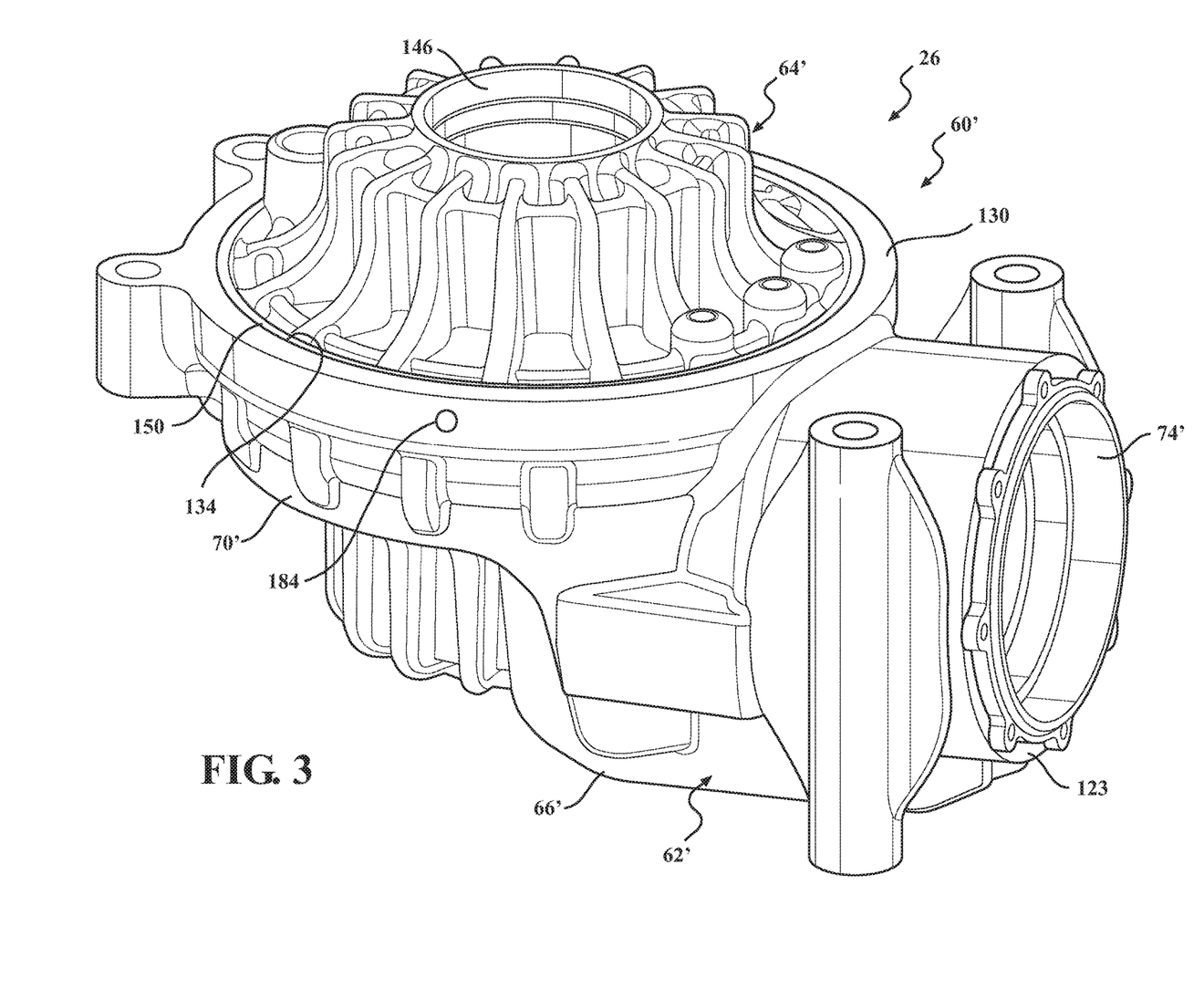
FIG. 3 is an isometric view of a housing assembly adapted for use with the drive axle unit of FIG. 2 and incorporating in-situ molded retention components made using an injection molding process according to the present disclosure.

Front driveline 12 is shown to include a pair of front wheels 24 connected at opposite ends of a front axle assembly 25 having a front drive axle unit 26 configured to include a front differential assembly 28 and a front pinion shaft assembly 30, best shown in FIG. 2. Front differential assembly 28 is driven by front pinion shaft assembly 30 and functions to transfer drive torque while permitting speed differentiation between a pair of front axleshafts 32 that are drivingly connected to front wheels 24. A front propshaft 34 is connected between front pinion shaft assembly 30 and a front output shaft 36 of transfer case 20 for rotation about a front axis "F".

Similarly, rear driveline 14 includes a pair of rear wheels 38 connected at opposite ends of a rear axle assembly 39 having a rear drive axle unit 40 configured to include a rear differential assembly 42 and a rear pinion shaft assembly 44. Rear differential assembly 42 is driven by rear pinion shaft assembly 44 and functions to transfer drive torque while permitting speed differentiation between a pair of rear axleshafts 46 that are drivingly connected to rear wheels 38. A rear propshaft 48 is connected between rear pinion shaft assembly 44 and a rear output shaft 50 of transfer case 20 for rotation about a rear axis "R". The specific configuration of transfer case 20 is not shown, but is schematically provided with a transfer device 52 operable in an actuated mode to selectively and/or automatically transfer drive torque from rear output shaft 50 to front output shaft 36 so as to establish the four-wheel drive (4WD) mode. When transfer device 52 is operating in a non-actuated mode, all drive torque from the powertrain is transmitted via rear output shaft 50 to rear driveline 14 so as to establish a two-wheel drive (2WD) mode.

Referring now to FIG. 2, a stick diagram of front drive axle unit 26 is shown to include a housing assembly 60 in addition to front differential assembly 28 and front pinion shaft assembly 30. Housing assembly 60 includes a first housing component, hereinafter referred to as axle housing 62, and a second housing component, hereinafter referred to as axle housing cover 64.

Axle housing 62 includes a tubular first segment 66 defining a pinion shaft chamber 68, and a larger second segment 70 defining a differential chamber 72. Pinion shaft assembly 30 is disposed within chamber 68 and includes a pinion cartridge housing 74, a pinion shaft 76, and a bearing unit 78 rotatably supporting pinion shaft 76 from cartridge housing 74. Bearing unit 78 can include a pair of laterally-spaced bearing assemblies mounted in cartridge housing 74. As will be detailed, an injection molding process is used to form one or more in-situ molded retainer components, schematically shown by annular ring 80, for rigidly locating and securing cartridge housing 74 with respect to first segment 66 of axle housing 62 within chamber 68.

With continued reference to FIG. 2, differential assembly 28 is shown to include a carrier 84 that is rotatably supported by a pair of laterally-spaced bearing units 86, 88 from housing assembly 60, a pair of pinion gears 90 rotatably driven by carrier 84, and a pair of side gears 92, 94 each shown meshed with both pinion gears 90 and being drivingly connected to one of front axleshafts 32.

A hypoid gearset 96 is provided to transmit drive torque from pinion shaft 76 to carrier 84. Hypoid gearset 96 includes an input pinion 98 fixed for rotation with pinion shaft 76, and a ring gear 100 fixed for rotation with carrier 84. As will also be detailed, axle housing cover 64 is secured to axle housing 62 via one or more in-situ molded retainer component, schematically shown by annular ring 102 formed via the injection molding process. One example of the construction of front differential assembly 28 and the connection of ring gear 100 to differential carrier 84 is disclosed in commonly-owned U.S. Provisional application Ser. No. 14/733,775 filed Jun. 8, 2015 and titled "Differential Assembly with Single Weld Joint Connecting Two-Piece Differential Case and Ring Gear", the entire disclosure of which is incorporated herein by reference.

Referring now to FIGS. 3 through 6, an example of a multi-piece axle housing assembly 60' for use in drive axle unit 26 (FIGS. 1 and 2) is generally shown to include an axle housing 62', an axle housing cover 64', and a cartridge housing 74' associated with pinion shaft assembly 30 (FIGS. 1 and 2). Axle housing 62' is configured to include a first housing segment 66' defining a pinion shaft chamber 68', and a second housing segment 70' defining a differential chamber 72'. First housing segment 66' is a tubular extension and includes an outer cylindrical surface 120, and inner cylindrical surface 122, and a planar end surface 123. Second housing segment 70' includes an enlarged central portion 124 configured to enclose differential assembly 28 and ring gear 100, and a reduced diameter and portion 126 configured to enclose a boss portion of differential carrier 84 and support differential bearing unit 88 thereon. A cylindrical aperture 128 permits axleshaft 32, drivingly connected to side gear 94, to extend outwardly from end portion 126. Central portion 124 of axle housing 62' is configured to include a cylindrical end portion 130 having an outer diameter surface 132, an inner diameter surface 134, and a planar end surface 136.

Axle housing cover 64' is shown to include a rim segment 140 and a transversely-extending tubular segment 142. Tubular segment 142 includes a cylindrical portion 144 configured to enclose the opposite boss portion of differential carrier 84 and support differential bearing assembly 86 thereon. A cylindrical aperture 146 permits axleshaft 32, fixed to side gear 92, to extend outwardly from tubular segment 142 of axle housing cover 64'. Rim segment 140 includes an outer edge surface 150. The outer diameter of edge surface 150 is sized to permit sliding entry into and alignment with inner diameter surface 134 of end portion 130 of axle housing 62'.

Cartridge housing 74' is shown to include a tubular segment 160 and a transversely, extending flange segment 162. An outer diameter surface 164 of tubular segment 160 is sized to be press-fit into engagement with inner surface 122 of first housing segment 66' of axle housing 62'. Serrations 166 are provided to resist axial movement of cartridge housing 74' within tubular segment 66' upon proper axial alignment of pinion shaft assembly 30.

Figure 4:
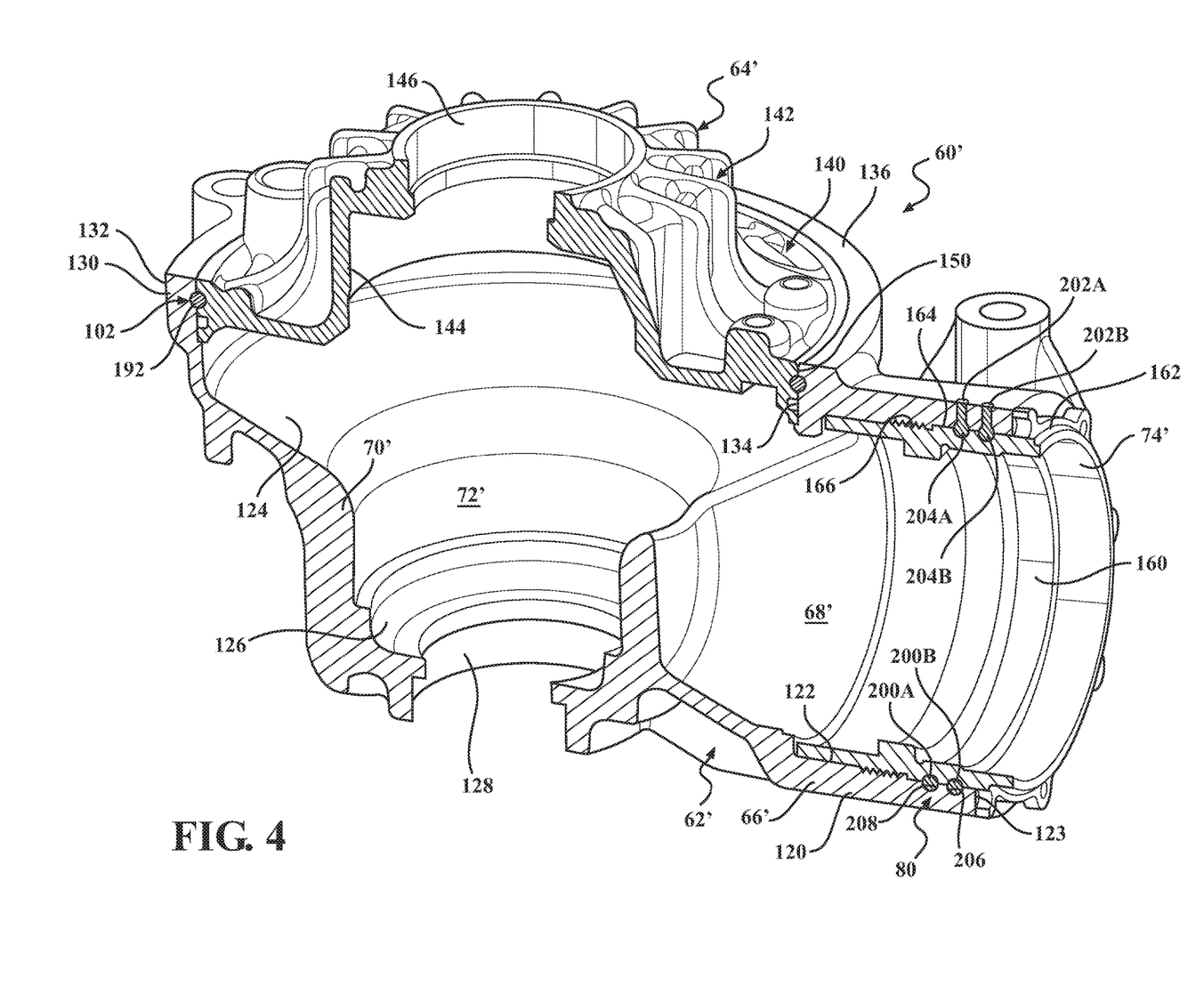
FIG. 4 is a sectional view of the housing assembly shown in FIG. 4.
Figure 5:
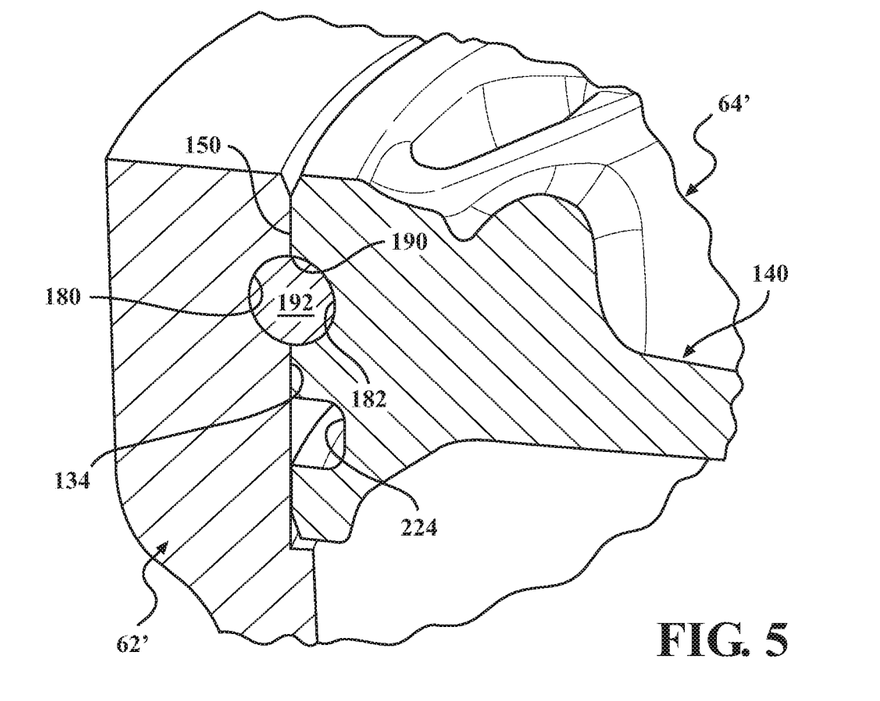
FIG. 5 is an enlarged partial view taken from FIG. 4 illustrating the molded retention component securing the axle housing cover to the axle housing of the housing assembly.

Referring particularly to FIGS. 4 and 5, an in-situ molded retention arrangement according to the present disclosure will now be described. Specifically, a first mold indentation or first groove 180 is formed in wall surface 134 of end segment 130 of axle housing 62'. A second mold indentation or second groove 182 is formed in outer wall surface 150 on rim segment 140 of axle housing cover 64'. A first molding gate 184 is configured as a radial bore formed through end segment 130 of axle housing 62' and which communicates with first groove 180. Upon installation of axle housing cover 64' into the open end of end segment 130 of axle housing 62', second groove 182 becomes aligned with first groove 180 so as to define a first retention mold channel or chamber 190. Obviously, axle housing cover 64' is installed onto axle housing 62' following assembly of differential assembly 28 therein. Following alignment of grooves 180, 182 to establish first retention mold chamber 190, a molten liquid material is injected, via an injection molding process, through first molding gate 184 to fill first retention mold chamber 190. The molten material is allowed to cool and harden into an in-situ molded retainer component 192 that is located in first retention chamber 190 and functions to secure axle housing cover 64' to axle housing 62'. In the particular embodiment shown, first mold groove 180 and second mold groove 182 extend completely around the periphery of the surface they are formed in, and are both arcuate in shape to facilitate molding of a continuous molded retainer ring having a common diameter. However, first mold groove 180 and/or second mold groove 182 can be non-arcuate (i.e., rectangular, triangular, serrated-star shaped, etc.) to create a non-arcuate retainer ring having a variable diameter and/or outside dimensions. While only one first retention chamber 190 and one in-situ molded retainer component 192 are shown between axle housing 62' and axle housing 64', it is contemplated that two or more laterally-spaced first retention chambers and first molded retainer components can be used by simply forming alignable sets of laterally-spaced first grooves and second grooves.

As best seen from FIG. 4, a pair of second in-situ molded retainer components 200A, 200B are disposed between outer surface 164 of cartridge housing 74' and inner surface 122 of axle housing 62'. Retainer component 200A is formed via an injection molding process wherein a molten material is injected through a second molding gate 202A formed through tubular segment 66' of axle housing 62' into a second retainer mold channel or chamber 204A defined between a third mold indentation or groove 206A formed in surface 122 of axle housing 62' and a fourth mold indentation or groove 208A formed in surface 166 of pinion cartridge housing 74'. Retainer component 200B is laterally-spaced relative to retainer component 200A and is formed via an injection molding process wherein a molten material is injected through a second molding gate 202B formed through tubular segment 66' of axle housing 62' into a second retainer mold channel or chamber 204B defined between a third mold indentation or groove 206B formed in surface 122 of axle housing 62' and a fourth mold indentation or groove 208B formed in surface 166 of cartridge housing 74'.

While a pair of second in-situ molded retainer components 200A, 200B are shown to secure pinion cartridge housing 74' to axle housing 62', it is contemplated that any other number of retainer components can be used as required. Again, while molded retainer components 200A, 200B are shown as continuous circular retainers, other configurations, dimensions and sizes are contemplated and available by simply re-configuring the dimensions and profile of third mold grooves 206A, 206B and/or fourth mold grooves 208A, 208B.

A front axle assembly is shown for the purpose of illustrating the concept, although the concept could be applied to various products in which components of an assembly must be attached.

In accordance with a method of the present disclosure, a molten material, such as a polymer, would be injected between the two housing parts to be attached, into a channel formed by indentation features in both of the parts, so that the parts act as the mold. The material would be injected similar to an injection molding operation, except that instead of a reusable mold separating to release the formed plastic part, the formed plastic would cure in place, to establish a molded retainer component operable for preventing the housing parts from separating. The injection molded feature would be loaded in shear when forces within the drive axle unit push one part away from the other. A thermoplastic or thermoset material could be used. An engineering polymer such as glass filled PEEK, with higher strength, appropriate temperature capability for the application, and an acceptable thermal expansion coefficient could also be used. The concept is not limited to PEEK. Other materials are to be considered. The illustrations show a round cross-section. Other cross-section shapes would be possible.

Figure 6:
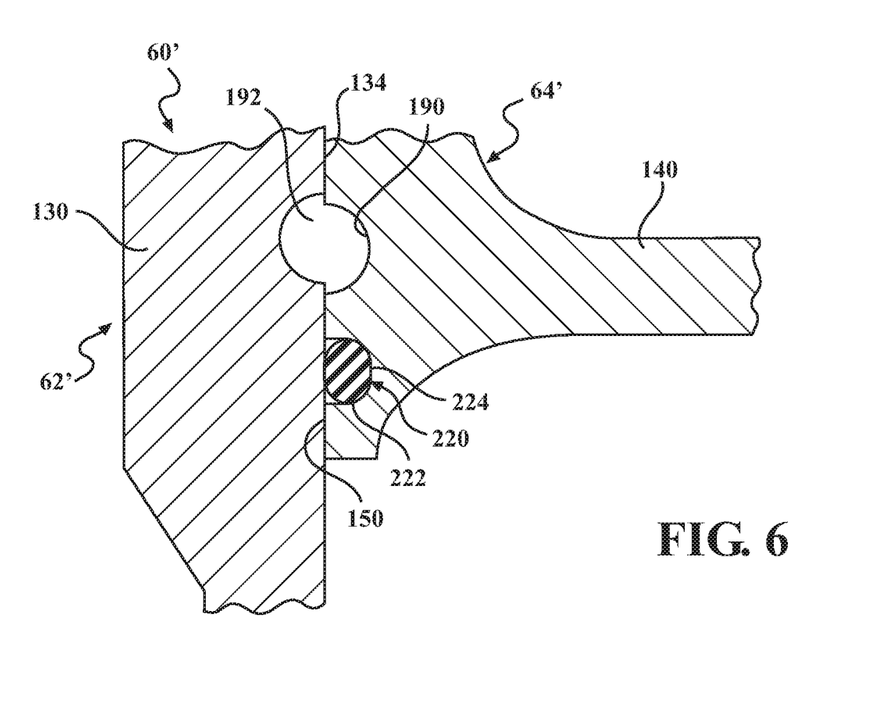
FIG. 6 is a side view of FIG. 5.
Figure 7:
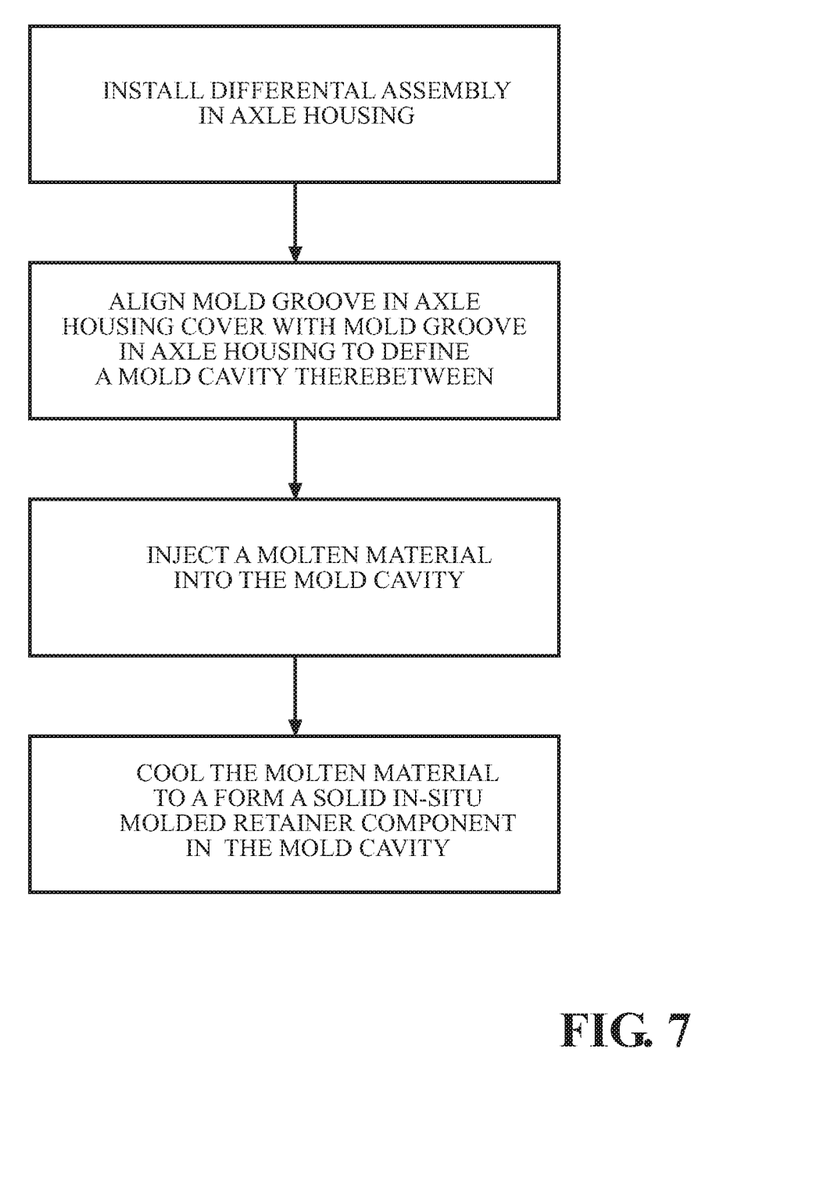
FIG. 7 is a diagram illustrating a method of assembling the components of the drive axle unit and forming the in-situ retainer components using the injection molding method of the present disclosure.

Since a sufficiently strong material would be rigid, it might not provide sealing to keep fluids contained within the assembly. An o-ring system 220 is shown in FIG. 6 for sealing of axle housing cover 64'. An o-ring 222 would be placed into a groove 224 in the housing cover 64' before insertion of the cover 64' into the housing 62'. The seal 222 might also be formed by injecting a material into the seal cavity 224, either using a melted rubber material or a liquid sealant which cures after injection, although this would lack the compression as with an o-ring which might be necessary to maintain a seal under all thermal and loading conditions. It might be possible to find an injectable polymer which provides the strength to hold the parts in position and which also provides sealing. The invention is configured so that an injected ring provides retention alone, or retention and sealing. An o-ring seal could also be added to the pinion cartridge housing 74' in case additional sealing would be needed, although in this case there is a press fit of the pinion housing 74' to the axle housing 62', so no other sealing might be required.

The axle assembly 26 shown has the injection molded retention feature only shown for round parts and in one plane, but the concept could be applied to parts with other geometry. In the case of retaining parts with a shape which is not round and/or with non-planar mating surfaces, an injected retention feature which provides sealing would be beneficial. Alternatively, a face-sealing gasket, curable liquid sealant applied between the parts, or the injection of sealant into a separate cavity might be used. The invention is therefore not limited to ring shapes, so the images included in this patent application are not limiting and could include alternative shapes if needed. In such an axle assembly as shown, the housing 62' and housing cover 64' support the forces generated by subcomponents within the assembly. For example, when torque is applied to the input shaft of an axle assembly, gear forces are generated, which transmit the forces through shafts, into the bearings, and then to the bearings' mounting locations in the assembly. In normal operation, forces act on the axle housing cover and on the pinion cartridge housing, working to separate them from the axle housing. The injection molded retaining rings would react these forces, holding the assembly together. The loads would be supported by shear stress through the injected retaining ring.

The bearings for such an assembly typically require preload. For a bolted assembly, the preload would be adjusted using shims within the assembly, and sometimes a deformable component such as a crush sleeve to prevent bearing overload. The concept of the invention is to apply the bearing preload to the housing cover and then inject the material, so that the desired bearing preload is achieved more easily and with fewer components.

Per the previous paragraph, the injection molded retaining ring used for an axle housing cover would need to support the bearing preload immediately during the assembly process. To expedite and assist the assembly process, with the bearing preload applied, a secondary mechanical feature could be used to hold the bearing preload while the injection molded retainer ring (or rings) cool or cure to achieve the required strength. One secondary feature includes (described for the housing/housing cover):

A. Drilling three or more small holes radially inward (towards the axle centerline) through the housing and into the housing cover. Inserting three small pins which are capable to support the bearing preload. The pins could be left in the assembly or removed;

B. Incorporating three or more set screws in the housing. When the preload is applied to the housing cover, tighten the set screws until they grip the housing cover with sufficient force to hold the cover in place with the preload force applied. The manufacturing process could be controlled by specifying the set screw torque;

C. Using a coining or staking process to deform the housing or housing cover, creating an interference with sufficient strength to support the bearing preload while the polymer cures, in enough locations to also keep the cover parallel with the housing.

In the case of the pinion assembly 30, similar mechanical attachment methods to those described above could be used to assist the manufacturing process, although the retaining rings for the pinion design shown do not support the bearing preload during the axle manufacturing, so one pin, set screw, or coined/staked area could be sufficient.

As is known, a conventional welded assembly requires similar materials for the welding operation to work. With the injection molded retention method, there is no bond between the components. The housing 62' and cover 64' could therefore be made from different materials. For example, the housing 62' could be aluminum, and the cover 64' magnesium, or vice versa. This is particularly interesting since dissimilar metals generally can't be welded together, and challenges can arise with bolting due to dimensional changes with temperature changes. This retention method may therefore be an enabler to combine materials in a housing assembly which would otherwise not be possible. In the case of the housing cover shown, forged carbon fiber could be an good material for such an application since the generally round shape could be easily created, and it would offer a weight reduction vs. a metal cover.

Bearing preload would be achieved by holding the housing cover 64' with the preload force and injecting the material. The concept allows for the preload to be set without the housing cover 64' being pressed against an end-stop in the housing 62', so there is more tolerance for misalignment of the housing components, as compared to other housing assembly methods which require flat mating surfaces, driving the need for a variety of shims to be used in production. The images in FIG. 6 show how the retaining ring could be injected without perfect alignment of the two halves of the retaining ring cavity. The size of the cavity would be determined based on the maximum possible misalignment and the required retaining ring size.

The invention was conceived to develop a lightweight front axle drive unit. The desired housing materials are magnesium or aluminum. Magnesium provides a weight benefit vs. aluminum, but there are no mature welding processes for joining magnesium components. The present disclosure creates a circumferential mold channel for attaching the magnesium axle housing cover and then inject molten magnesium into the channel as a retention feature. The present disclosure was extended to use an injectable polymer in the mold channel. Additionally, it was realized that the pinion assembly, which was previously designed with a threaded interface, could be retained similarly.

Fasteners are eliminated for weight savings. Welding is avoided for energy and time savings (lower production costs). When fastening housing halves, the mating sides require a very flat face to assure sealing. The injection molded retention would be more tolerant of gaps and misalignments between mating components. Bearing preload could be achieved without measuring and shimming the internal subassemblies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive axle unit for use in a motor vehicle comprising:
   a multi-piece axle housing assembly including at least a first housing component and a second housing component;
   at least one in-situ molded retainer component interconnecting the first and second housing components;
   a pinion shaft assembly; and
   a differential assembly;
   wherein the first housing component is an axle housing configured to define a pinion housing segment rotatably supporting the pinion shaft assembly and a differential housing segment rotatably supporting a first portion of the differential assembly, wherein the first housing component defines a first mold groove, and the second housing component defines a second mold groove in alignment with the first mold groove to define a retention mold chamber between the first and second mold grooves, and wherein the at least one in-situ molded retainer component is disposed in the retention mold chamber.

2. The drive axle unit according to claim 1 wherein a molding gate is defined by an outer surface of at least one of the first and second housing components and extends to the retention mold chamber for providing a flow path for molten liquid material to flow through to the retention mold chamber to form the in-situ molded retainer component.

3. The drive axle unit according to claim 1 wherein the axle housing defines an open end and an inner peripheral edge surface at the open end, wherein the second housing component is an axle housing cover adapted to be secured to the open end of the axle housing and having an outer peripheral edge surface disposed adjacent to the inner peripheral edge surface of the open end of the axle housing, and wherein the first mold groove is defined by the inner peripheral edge surface of the axle housing and the second mold groove is defined by the outer peripheral edge surface of the axle housing cover.

4. The drive axle unit according to claim 3 wherein the first mold groove extends annularly along the inner peripheral edge surface of the axle housing and the second mold groove extends annularly along the outer peripheral edge surface of the axle housing cover to define a continuous ring shape of the retention mold chamber.

5. The drive axle unit according to claim 1 wherein at least one of the first and second housing components defines a seal groove between the first and second housing components and adjacent to the mold retention chamber, and wherein an o-ring is disposed in the seal groove for preventing fluids from passing between the first and second housing components.

6. The drive axle unit according to claim 1 wherein the first and second mold grooves each have an arc-shape.

7. The drive axle unit according to claim 1, wherein the second housing component is an axle housing cover adapted to be secured to an open end of the axle housing and rotatably support a second portion of the differential assembly, the axle housing cover having an outer peripheral edge surface configured to be in close proximity to, or press-fit engagement with, an inner peripheral edge surface of the open end of the axle housing.

8. The drive axle unit according to claim 7, wherein at least one of the first mold groove and the second mold groove is configured to be non-arcuate and the retainer component includes an irregular-shape having a variable diameter.

9. The drive axle unit according to claim 8 further including a hypoid gearset.

10. A drive axle unit comprising:
    a pinion shaft assembly;
    a differential assembly;
    a hypoid gearset;
    an axle housing assembly including a first housing component and a second housing component; and
    an injection-molded retention arrangement adapted to be formed between the first and second housing components.

11. The drive axle unit according to claim 10, wherein the first housing component is an axle housing configured to define a pinion housing segment adapted to rotatably support the pinion shaft assembly, and a differential housing segment adapted to rotatably support a first portion of the differential assembly.

12. The drive axle unit according to claim 11, wherein the second housing component is an axle housing cover adapted to be secured to an open end of the axle housing and rotatably support a second portion of the differential assembly, the axle housing cover having an outer peripheral edge surface configured to be in close proximity to, or press-fit engagement with, an inner peripheral edge surface of the open end of the axle housing.

13. The drive axle unit according to claim 12, wherein a first annular mold indentation is formed in the inner peripheral edge surface of the axle housing which is alignable with a second annular mold indentation formed in the outer peripheral edge surface of the axle housing cover, wherein a first injection molding gate communicates with one of the first and second mold indentations to provide a flow path for injection of a molten material into a first retainer mold chamber formed between the aligned first and second mold indentations, and wherein the molten material is injected to fill the first retainer mold chamber and allowed to cool and solidify into the in-situ formed first retainer component.

14. The drive axle unit according to claim 13, wherein the pinion shaft assembly includes a pinion cartridge housing disposed within the pinion housing segment of the axle housing, wherein the pinion cartridge housing has an outer edge surface configured to be in close proximity to, or pressed engagement with, an inner edge surface of the pinion housing segment of the axle housing, wherein a third annular mold indentation is formed in the inner edge surface of the axle housing and is alignable with a fourth annular mold indentation formed in the outer edge surface of the pinion cartridge housing, wherein a second injection molding gate communicates with at least one of the third and fourth mold indentations to provide a flow path for injection of a molten material into a second retainer mold chamber formed between the aligned third and fourth mold indentations, and wherein the molten material is injected to fill the second retainer mold chamber and allowed to cool and solidify into an in-situ formed second retainer component.

15. The drive axle unit according to claim 13, wherein a pair of first retainer components are formed between the axle housing and the axle housing cover, the pair being laterally-space and each including a corresponding first molding gate.

16. The drive axle unit according to claim 13, wherein the alignable mold indentations are arcuate to define circular ring-shaped retainer components.

17. The drive axle unit according to claim 13, wherein one or more of the alignable mold indentations is configured to be non-arcuate to define irregular-shaped retainer components.

18. A drive axle unit, comprising:
   a pinion shaft assembly;
   a differential assembly;
   an axle housing assembly including an axle housing and an axle housing cover, the axle housing defining a pinion housing segment rotatably supporting the pinion shaft assembly and a differential housing segment rotatably supporting a first portion of the differential assembly, the axle housing cover configured to enclose an open end of the axle housing and rotatably support a second portion of the differential assembly; and
      an injection-molded retention arrangement formed between the axle housing and the axle housing cover.

19. The drive axle unit according to claim 18, wherein the axle housing cover has a first peripheral edge surface configured to be in close proximity or press-fit engagement with a second peripheral edge surface associated with the open end of the axle housing.

20. The drive axle unit according to claim 19, wherein a first annular mold indentation is formed in the first peripheral edge surface of the axle housing cover which is alignable with a second annular mold indentation formed in the second peripheral edge surface of the axle housing, wherein a first injection molding gate communicates with one of the first and second mold indentations to provide a flow path for injection of a molten material into a first retainer mold chamber formed between the aligned first and second mold indentations, and wherein the molten material is injected to fill the first retainer mold chamber and allowed to cool and solidify into the in-situ formed first retainer component.

21. The drive axle unit according to claim 20, wherein the pinion shaft assembly includes a pinion cartridge housing disposed within the pinion housing segment of the axle housing, wherein the pinion cartridge housing has an outer edge surface configured to be in close proximity to, or pressed engagement with, an inner edge surface of the pinion housing segment of the axle housing, wherein a third annular mold indentation is formed in the inner edge surface of the axle housing and is alignable with a fourth annular mold indentation formed in the edge surface of the pinion cartridge housing, wherein a second injection molding gate communicates with at least one of the third and fourth mold indentations to provide a flow path for injection of a molten material into a second retainer mold chamber formed between the aligned third and fourth mold indentations, and wherein the molten material is injected to fill the second retainer mold chamber and allowed to cool and solidify into an in-situ formed second retainer component.

22. The drive axle unit according to claim 18, wherein a pair of first retainer components are formed between the axle housing and the axle housing cover, the pair being laterally-space and each including a corresponding first molding gate.

\* \* \* \* \*